Oct. 21, 1958
P. ROSS
2,856,815
REAR VIEW MIRROR MOUNTING MEANS
Filed March 9, 1954
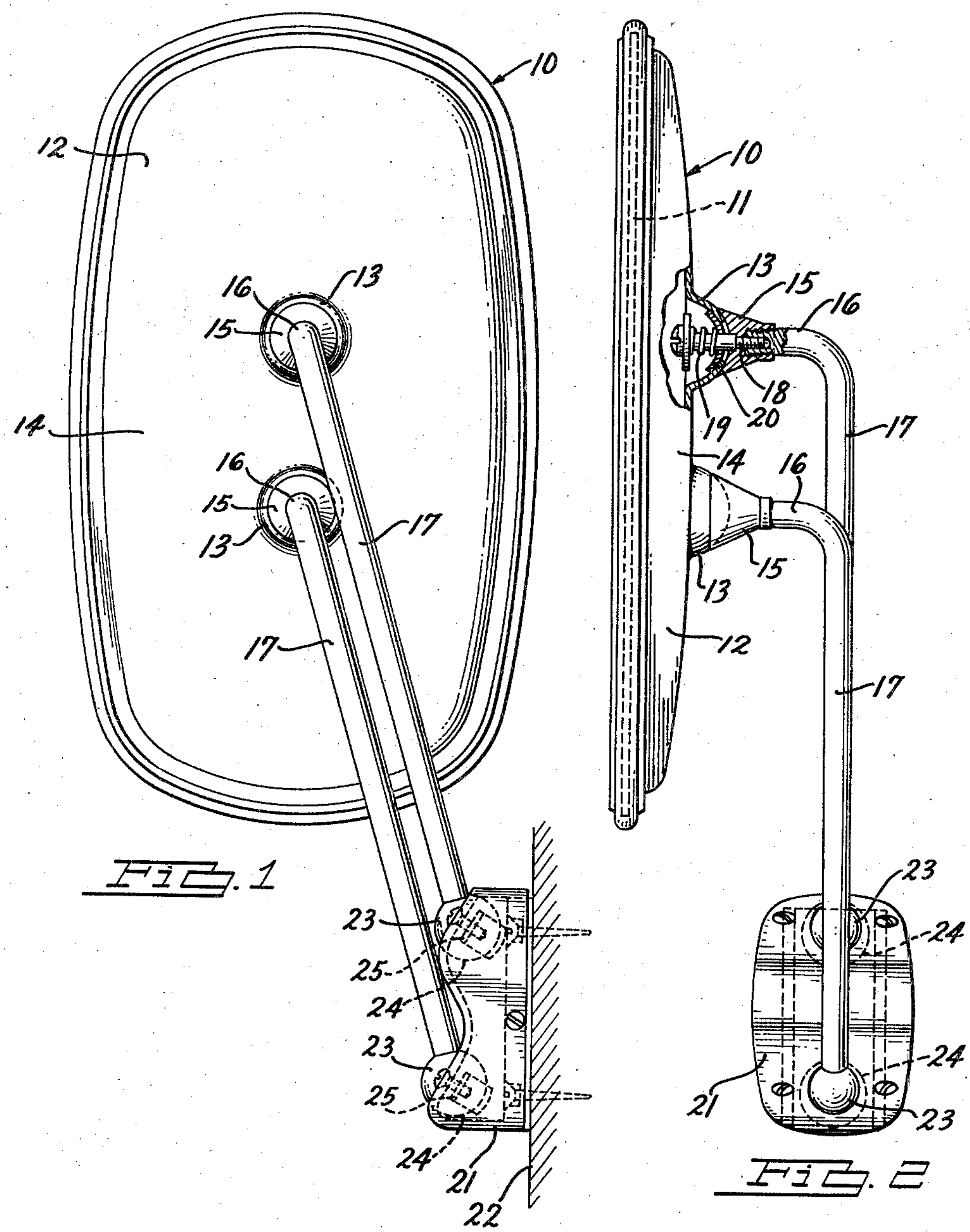
INVENTOR.
PAUL ROSS
BY
John Joseph Roethel

United States Patent Office 2,856,815

Patented Oct. 21, 1958

2,856,815

REAR VIEW MIRROR MOUNTING MEANS

Paul Ross, Wuppertal-Langerfeld, Germany, assignor to Gebruder Happich-Gesellschaft mit beschrankter Haftung, Wuppertal-Elberfeld, Germany Application March 9, 1954, Serial No. 415,087

Claims priority, application Germany September 18, 1953

4 Claims. (Cl. 88—98)

This invention relates to rear view mirror mounting means and more particularly to a mounting means for a heavy duty rear view mirror such as is mounted exteriorly of a truck cab or motorbus body.

It is indispensable that a rear view mirror mounted exteriorly of a vehicle body be mounted on articulated support members. Such articulation permits the driver to adjust the mirror to provide full vision regardless of his height or the relative height of his eye level above the road. The necessary articulated mounting of the mirror on the vehicle body is subject to the disadvantage that the vibration of the vehicle body as the vehicle is driven over the highway frequently is transmitted to the articulated mounting resulting in the mirror undesirably changing position.

The conventional way of preventing such shifting of the mirror or, in effect, to bind the articulated support members is to increase the friction at the connecting joints either by increasing the radii of the ball and socket joints or by increasing the friction coefficient of the working surfaces of such joints. The utility of either of these two methods is questionable since increasing the radii of the joints results in a clumsy and expensive articulation while increasing the friction coefficient results in rapid wear of the joints. In the latter case, frequent repairs will be required. For example, if a brake facing is interposed in the joint, the friction coefficient will change because of the gradual chamfering or wearing down of the brake facing. In addition there is the risk that even if the articulated joints are designed to be watertight, condensation will form inside the joints therefore affecting the adhesion of the brake facing to the opposed working surface.

Further, with conventional mirror mounting it is necessary to provide a mirror as small as possible to minimize the weight thereof and to minimize the area against which wind caused by movement of the vehicle may act. As it serves to increase the safety on the road if the rear view mirror be so constructed that it reflects as large as possible the area behind the vehicle, mirrors having a convex surface were designed to compensate for the smallness of size. Unfortunately, such convex mirrors produce a distorted image.

It is an object of the present invention to overcome the disadvantages of conventional mirror and mounting thereof and thereby obviate the perils of road traffic resulting from an unreliable rear view mirror. It is thus an object to provide a mirror mounting means which will permit ready manual adjustment of the mirror while retaining the same in adjusted position under even the most adverse conditions of usage.

The objective of the present invention has been achieved by supporting the mirror on the vehicle body mounting bracket by means of two rods acting in parallelogram fashion. The parallelogram support rods or members doubles the friction in the articulations or joints at both the mirror body member and at the vehicle body mounting bracket while permitting easy manual adjustment of the mirror and secure retention thereof in adjusted position. The parallelogram support members permit a larger size mirror to be used which is capable of reflecting, to the driver's advantage, a larger area of the roadway behind the vehicle. The support rods may be hollow thus lowering their weight.

Other objects, advantages and features of construction will appear in the following description and appended claims, reference being had to the accompanying drawings forming a part of this specification wherein like reference characters designate corresponding parts in the several views.

Fig. 1 is a rear elevational view of the mirror illustrating the mounting thereof on the vehicle body.

Fig. 2 is a side elevational view in part sectional of Fig. 1.

Before explaining in detail the present invention it is to be understood that the invention is not limited in its application to the details of construction and arrangements of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, an embodiment of the present invention mounted on a vehicle body. The mirror device, generally designated 10, comprises a mirror glass 11 mounted in a body member 12 having two spaced semispherical nodes 13 formed on the rear surface 14 thereof. The nodes 13 are seated in socket members 15 secured to the end 16 of two rods 17. The rod ends 16 are parallel to each other and angularly related to their respective rods 17. The nodes 13 are adjustably maintained in the socket members 15 by securing means comprising a shoulder screw 18 threaded into the rod end 16, said screw 18 carrying a compression spring 19, one end of which exerts pressure on a curved washer 20 engaging the inner surface of the node 13. It will be apparent that the tension on the spring 19 may be varied by adjusting the screw 18.

The rods 17 are maintained in parallel relationship by being mounted in a bracket member 21 adapted to be secured to the exterior of the vehicle body 22. The rods 17 at their lower ends are provided with balls 23 adapted to be seated in sockets 24 in the mounting bracket 21. Pressure means 25 are provided to tighten the balls in the sockets to provide a reasonable amount of resistance to movement.

The foregoing construction and arrangement provides an articulated mounting of the mirror glass which is sturdy and resistant to changes in position due to vehicle vibration or wind forces acting on the mirror.

I claim:

1. A rear view mirror supporting structure comprising a bracket member adapted to be secured to the exterior of a vehicle body, a mirror containing body member, a pair of spaced parallel support rods, each support rod having an elongated section terminating in a section of shorter length at an angle thereto, each support rod having a ball member on one end and a node receiving socket on the other end thereof, socket means in said bracket member receiving each ball member, said socket means comprising two sockets vertically spaced one above the other, and a pair of nodes on said mirror containing body member vertically spaced one above the other seated in said node receiving sockets, whereby said mirror containing body member is articulately mounted on said bracket member, said rods being maintained with the corresponding sections thereof in spaced substantially parallel relationship while maintaining the plane of a mirror surface in the mirror containing body member parallel to a vertical axis through the mirror containing body member, said node and socket connections including adjustable pressure means for varying the tightness of the connection.

2. A rear view mirror supporting structure comprising a bracket member adapted to be secured to the exterior of a vehicle body, a mirror containing body member, a pair of spaced parallel support rods, each support rod having an elongated section terminating in a section of shorter length at an angle thereto, each support rod having a ball member on one end and a node receiving socket on the other end thereof, socket means in said bracket member receiving each ball member, said socket means including means to increase the frictional resistance to movement of the ball members relative to the socket means, said socket means comprising two sockets vertically spaced one above the other, and a pair of nodes on said mirror containing body member vertically spaced one above the other seated in said node receiving sockets, whereby said mirror containing body member is articulately mounted on said bracket member, said rods being maintained with the corresponding sections thereof in spaced substantially parallel relationship while maintaining the plane of a mirror surface in the mirror containing body member parallel to a vertical axis through the mirror containing body member, said node and socket connections including adjustable pressure means for varying the tightness of the connection.

3. A vehicle rear view mirror structure comprising a bracket member adapted to be secured to the exterior of a vehicle body, a mirror containing body member removably mounted on said bracket member, a pair of support rods, each support rod having an elongated section terminating in a section of shorter length at an angle thereto, connecting means articulately securing the outer ends of each support rod to said mirror containing body member, said connecting means comprising two vertically spaced nodes projecting from the side of the mirror containing body member opposite the mirror exposing side thereof, said nodes being received in node receiving sockets on said rods, mounting means articulately supporting the inner end of each rod on said bracket member, said mounting means comprising vertically spaced coacting ball and socket means on said rods and bracket member, whereby said support rods are swingable in all directions exteriorly of the vehicle body, said rods being maintained with the corresponding sections thereof in substantially parallel relationship while supporting said mirror containing body member in any adjusted position thereof with the surface plane of the mirror parallel to a vertical axis through said bracket member.

4. A vehicle rear view mirror structure comprising a bracket member adapted to be secured to the exterior of a vehicle body, a mirror containing body member removably mounted on said bracket member, a pair of support rods, each support rod having an elongated section terminating in a section of shorter length at an angle thereto, connecting means articulately securing the outer ends of each support rod to said mirror containing body member, said connecting means comprising two vertically spaced nodes projecting from the side of the mirror containing body member opposite the mirror exposing side thereof, said nodes being received in node receiving sockets on said rods, mounting means articulately supporting the inner end of each rod on said bracket member, said mounting means comprising vertically spaced coacting ball and socket means on said rods and bracket member, said connecting and mounting means being constructed and arranged so that the distance between the respective outer and inner ends of the rods are substantially equal whereby the corresponding sections of said rods in all positions of adjustment of the mirror containing body member will be substantially parallel to each other while maintaining the surface plane of the mirror parallel to a vertical axis through said bracket member.

References Cited in the file of this patent

UNITED STATES PATENTS

| | | |
|---|---|---|
| 325,419 | Langdon | Sept. 1, 1885 |
| 619,445 | Smith | Feb. 14, 1899 |
| 1,455,441 | La Hodny | May 15, 1923 |
| 1,538,339 | La Hodny | May 19, 1925 |
| 1,671,315 | Pruitt | May 29, 1928 |
| 1,868,031 | Sudbrink | July 19, 1932 |
| 1,909,526 | Falge et al. | May 16, 1933 |
| 1,932,697 | Jankovic | Oct. 31, 1933 |
| 1,938,350 | Oishei et al. | Dec. 5, 1933 |
| 1,992,828 | La Hodny et al. | Feb. 26, 1935 |
| 2,113,251 | Dover | Apr. 5, 1938 |
| 2,473,698 | Aves | June 21, 1949 |
| 2,648,256 | Budreck | Aug. 11, 1953 |
| 2,671,630 | Whitehead | Mar. 9, 1954 |